United States Patent
Maloney

[15] 3,643,900
[45] Feb. 22, 1972

[54] JIG PANEL FOR AIRFOIL

[72] Inventor: John P. Maloney, c/o World Engines 8960 Rossash Ave., Cincinnati, Ohio 45236

[22] Filed: Mar. 2, 1970

[21] Appl. No.: 15,772

[52] U.S. Cl. .................................244/123, 46/76 R
[51] Int. Cl. ..........................................B64c 3/20
[58] Field of Search ..............244/119, 120, 123, 124; 46/17, 46/76

[56] References Cited

UNITED STATES PATENTS 2,433,999   1/1948   Marhoefer...............244/124

Primary Examiner—Milton Buchler
Assistant Examiner—Steven W. Weinrieb
Attorney—Melville, Strasser, Foster & Hoffman

[57] ABSTRACT

A formed jig panel and method of fabricating therefrom an aircraft wing, aileron, flap, horizontal stabilizer, vertical stabilizer, or fuselage. The panel is formed with channels, into which spars are secured, the panel becoming an integral part of the finished structure and forming the top or bottom surface thereof. The configuration of the leading and trailing ends of the jig panel is such as to act as a locator and support for leading and trailing edge members which are secured thereto. Ease of assembly, accuracy and proper alignment are assured.

4 Claims, 11 Drawing Figures

PATENTED FEB 22 1972 3,643,900
INVENTOR
JOHN P. MALONEY
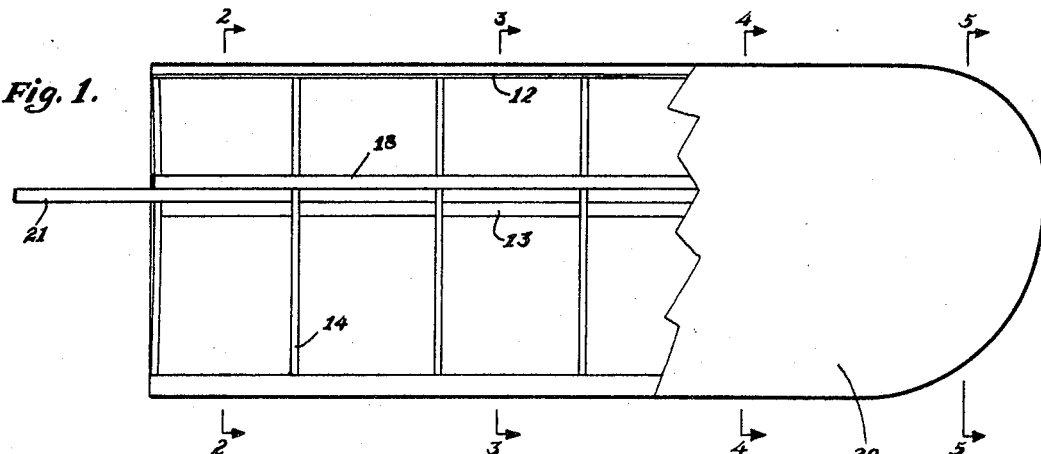
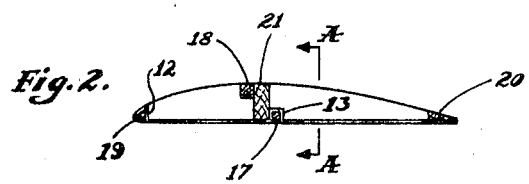
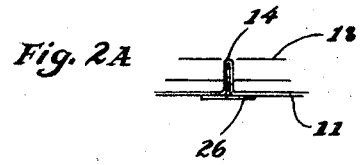
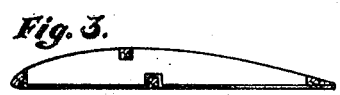
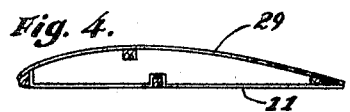
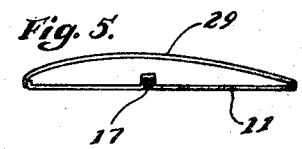
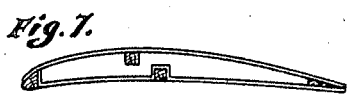
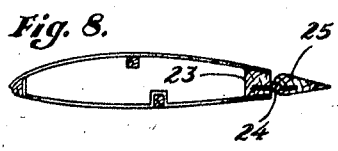
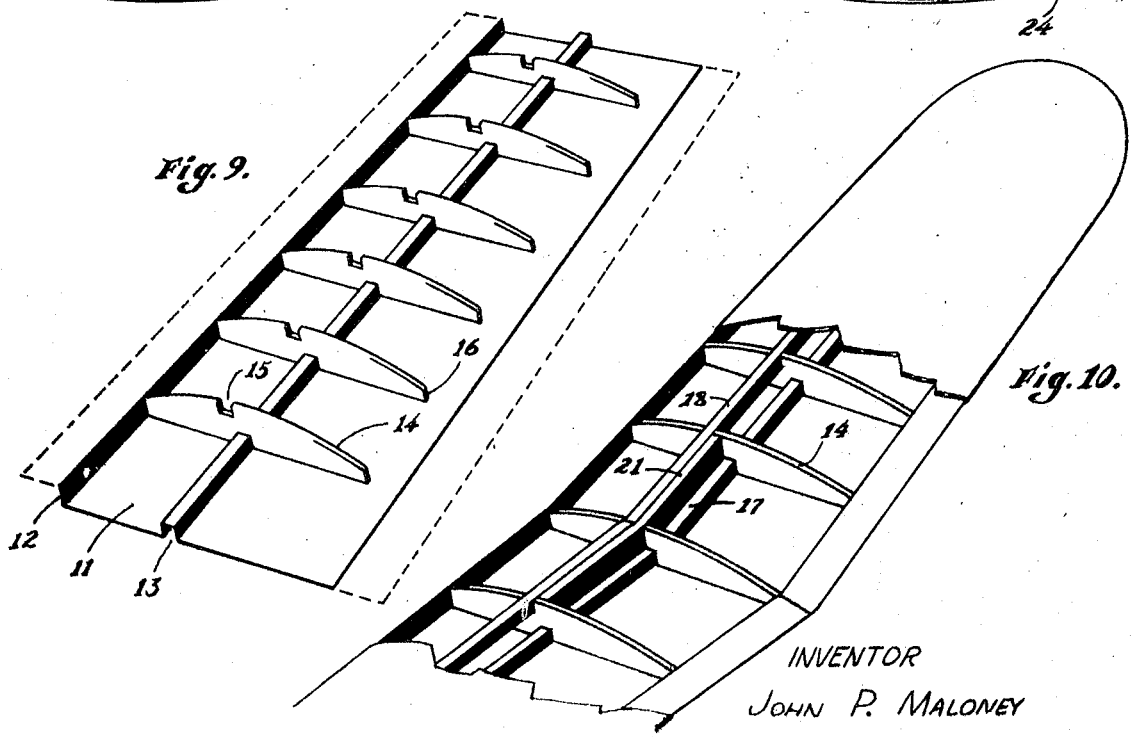

JIG PANEL FOR AIRFOIL

BACKGROUND OF THE INVENTION

1. Field of the Invention

This invention relates to a formed jig panel for use in the fabrication of aircraft wings and the like, and to a method of assembly thereof in which the jig panel is incorporated as an integral part of the finished structure. The invention further contemplates an aircraft wing, aileron, flap, horizontal or vertical stabilizer, or fuselage in which the jig panel constitutes at least one external surface thereof. Although applicable to aircraft of various types, the invention has particular utility in the fabrication of model aircraft as a hobby and will be so described in an exemplary embodiment.

2. Description of the Prior Art

In the conventional fabrication of model aircraft wings and the like, spar members and ribs, which are of wood, are laid out on a drawing or diagram on a working surface and secured together with adhesive. This is a slow and laborious process which is difficult to carry out with precision, except after long experience.

The prior art has suggested the use of jigs or clamps which can hold the various spar members and ribs in the desired position until the adhesive applied thereto has set. The jigs or clamps are then removed. However, to the best of applicant's knowledge, there has never been a suggestion to use a jig which would accurately position spar and rib members during adhesion thereof and then remain a part of the finished structure constituting an upper and/or lower external surface of the wing or like part of the aircraft.

SUMMARY

This invention provides easier and more precise assembly of aircraft structural members, such as airfoils, by the use of a formed jig panel which eliminates the necessity of covering the members with silk, paper or plastic film. The assembly jig panel of the invention is preferably a vacuum formed resin sheet having at least one channel, which will accommodate a spar in the desired alignment, for securing by adhesion into a finished assembly. The jig panel is incorporated in the completed structural member. Preferably, ribs and like stiffening elements are vacuum formed integrally in the resin sheet.

The method of the invention comprises vacuum forming a sheet of deformable material into a jig panel having a desired configuration of at least one surface of an airfoil and the like, forming at least one channel in said panel, simultaneously forming an abutment surface at the leading edge of said panel, inserting a structural element in said channel and adhesively securing said element therein, and adhesively securing a leading edge member to said abutment surface.

An airfoil fabricated in accordance with the invention comprises a formed jig panel having a configuration of a lower airfoil surface, a longitudinal channel therein, a lower spar in said channel, a plurality of rib members transversely of said jig panel formed integrally therewith, a notch in the upper surface of each rib, said notches being aligned longitudinally, an upper spar in said notches, a second formed panel having a configuration of an upper airfoil surface overlying and secured to said upper spar, and a leading edge supported by said rib members.

BRIEF DESCRIPTION OF THE DRAWING

Reference is made to the accompanying drawings illustrating an aircraft wing embodying the invention in which:

FIG. 1 is a top view of an aircraft wing with the top covering panel partially cut away to illustrate rib and spar construction;

FIG. 2 is a section on the line 2—2 of FIG. 1;

FIG. 2A is a section on the line A—A of FIG. 2;

FIG. 3 is a section on the line 3—3 of FIG. 1 illustrating a wing according to the invention without a top panel;

FIG. 4 is a section on the line 4—4 of FIG. 1 illustrating a wing with a top panel;

FIG. 5 is a section on the line 5—5 of FIG. 1 illustrating the structure at the wing tip;

FIGS. 6 and 7 are sectional views of wings of the invention having modified airfoil sections;

FIG. 8 is a section of an airfoil embodying the invention having at the trailing edge thereof an aileron or flap;

FIG. 9 is a perspective view of a formed jig panel of the invention; and

FIG 10 is a perspective view of a right wing joined to a center section or a left wing and reinforced by a dihedral brace.

DESCRIPTION OF THE PREFERRED EMBODIMENTS

Referring to FIG. 9 of the drawing a formed jig panel is indicated generally at 11. The panel is formed with a substantially vertical abutment surface 12 as a leading edge support. A longitudinal channel 13 extends the length of the panel and is adapted to receive a lower spar. A plurality of ribs 14 is formed transversely of the panel and integral therewith. Each rib member is provided with a notch 15 in the upper surface thereof, the notches 15 being in alignment in the longitudinal sense in order to receive and support an upper spar. Preferably, the leading edge of each rib member supports the vertical abutment 12 while the trailing edge 16 of each rib member is so configured as to locate and support a trailing edge.

In a model aircraft the jig panel preferably is vacuum-formed using a sheet of a synthetic resin which is deformable but relatively rigid after the forming operation is completed. It will of course be understood that in a standard aircraft a light metal alloy sheet of suitable thickness which can be formed or stamped would be substituted for the synthetic resin sheet.

The manner of assembly of a wing is illustrated in FIGS. 1, 2 and 10. As shown in FIG. 2, a lower spar 17 is adhesively secured in longitudinal channel 13. Contact cement or an epoxy resin adhesive may be used for this purpose. An upper spar 18 is then cemented into place in the notches 15 of the rib members 14. A leading edge 19 is cemented to the abutment surface 12, and a trailing edge 20 is cemented into place on the upper rear surface of the jig panel abutting the trailing edge surfaces 16 of the rib members 14 and is supported thereby.

As shown in FIG. 10, when right and left wing panels are joined, a dihedral brace 21 is adhesively secured along the channel 13 and along the upper spar 18.

It will be understood that the lower and upper spars 17 and 18, the leading and trailing edges 19 and 20, and the dihedral brace 21 are ordinarily made of wood.

Subsequent assembly steps will be apparent from FIGS. 1, 4, 5 and 8. An upper panel 29, preferably also vacuum-formed of the same material as the panel 11, is cemented into place overlying the leading edge member 19, the upper spar 18, trailing edge 20 and dihedral brace 21.

FIG. 8 illustrates the structure of the trailing edge when provided with an aileron or flap. The trailing edge member 23 of FIG. 8 is of greater thickness, and supports a hinge 24 to which the aileron or flap 25 is attached.

FIG. 2A illustrates a sectional view of rib member 14 formed integrally in panel member 11. Preferably a piece of tape 26 is provided to close the cavity resulting from the vacuum-forming of the rib member. In the same manner the lower exposed surface of the spar 17 may be covered with tape.

It is within the scope of the invention to provide transverse channels in which wooden rib members may be cemented, rather than to provide rib members 14 which are integral with the jig panel 11 as an incident of the vacuum-forming operation. However, it is preferred to provide the integrally formed rib members 14 as illustrated in FIG. 9.

FIG. 5 illustrates the structure of the wing tip, from which it will be noted that the lower spar 17 continues to the extremity of the wing tip, whereas the upper spar 18, leading edge member 19 and trailing edge member 20 terminate at the curved or rounded portion of the wing tip. The lower jig panel and upper panel are thus in direct contact with one another and are cemented together with a suitable adhesive.

Numerous modifications may be made in the invention without departing from the spirit thereof, and are to be considered within the scope of the invention as defined in the claims which follow. For example, the rib members could be formed integrally in a jig panel forming the upper surface of an airfoil, while the lower jig panel would be substantially planar, except for the longitudinal channel which accommodates the lower spar. The vacuum-formed upper panel may be omitted, and the top surface of the wing could be covered with paper, silk or a plastic film. The airfoil section could be convex, flat, or concave in order to permit the desired type of flight characteristic. The jig panel could be bent at the dihedral joint so that a wing could be fabricated with a predetermined correct dihedral angle. The tape 26 (FIG. 2A) may be a thin flat plastic material which conforms to the shape of the lower surface of the wing, or it could be vacuum-formed also. Finally, it will of course be recognized that any desired number of spars may be used in the construction of the wing or airfoil surface.

The embodiments of the invention in which an exclusive property or privilege is claimed are defined as follows:

1. A jig panel adapted to be incorporated as the lower surface of a wing in a model aircraft, said panel comprising a sheet of material formed into a configuration of the lower surface of said wing, at least one longitudinal outwardly facing channel in said panel adapted to accommodate a spar, a plurality of upstanding transverse rib members formed integrally in said panel, and a vertical abutment surface integral with said panel at the leading edge of said wing, said vertical abutment being supported by said transverse rib members and providing support for a leading edge member.

2. The panel of claim 1, wherein said rib members are configured at the trailing ends thereof to provide support and location for a trailing edge member.

3. An airfoil comprising a first, formed panel of relatively rigid material constituting the lower external surface thereof, a longitudinal outwardly facing channel formed integrally in said panel, a first spar secured in said channel, a plurality of upstanding transverse rib members formed integrally in said panel, a notch in the upper edge of each of said rib members, said notches being aligned in the longitudinal sense, a second spar secured in said notches, a vertical abutment surface formed integral with said panel at the leading edge of said airfoil, a leading edge member secured to said abutment surface, a trailing edge member secured on the trailing edge of said panel, a tape of material conforming to the shape of said lower external surface of said airfoil covering the cavities in said panel resulting from the formation of said integral rib members and channel and covering the external surface of said first spar, and a second, formed panel of relatively rigid material having a configuration of the upper surface of an airfoil, said panel being secured in overlying relation to said leading edge member, said second spar, said transverse rib members and said trailing edge member.

4. The airfoil claimed in claim 3, wherein said first and second spars are in spaced-apart relation, and including a dihedral brace inserted between said spars and secured to the facing vertical surfaces thereof.

* * * * *